(12) United States Patent
Cohen

(10) Patent No.: US 6,853,638 B2
(45) Date of Patent: *Feb. 8, 2005

(54) ROUTE/SERVICE PROCESSOR SCALABILITY VIA FLOW-BASED DISTRIBUTION OF TRAFFIC

(75) Inventor: Earl Cohen, Fremont, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,237

(22) Filed: Apr. 1, 1998

(65) Prior Publication Data

US 2002/0097736 A1 Jul. 25, 2002

(51) Int. Cl.[7] .................. H04L 121/66; H04L 9/00; H04L 12/56
(52) U.S. Cl. ............... 370/389; 370/235; 370/352; 711/216; 713/153; 713/160
(58) Field of Search ................ 370/235, 351, 370/352, 355, 359, 386, 389, 392, 411; 711/216; 370/401, 477; 713/153, 160

(56) References Cited

U.S. PATENT DOCUMENTS

| | | |
|---|---|---|
| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |

(List continued on next page.)

FOREIGN PATENT DOCUMENTS

| | | |
|---|---|---|
| EP | 0 384 758 A2 | 8/1990 |
| EP | 0 431 751 A1 | 6/1991 |
| EP | 0 567 217 A2 | 10/1993 |
| WO | WO93/07569 | 4/1993 |
| WO | WO93/07692 | 4/1993 |
| WO | WO94/01828 | 1/1994 |
| WO | WO95/20850 | 8/1995 |

OTHER PUBLICATIONS

William Stallings, Data and Computer Communications, PP: 329–333, Prentice Hall, Upper Saddle River, New Jersey 07458.

Allen, M., "Novell IPX Over Various WAN Media (IPXWAN)," Network Working Group, RFC 1551, Dec. 1993, pp. 1–22.

(List continued on next page.)

Primary Examiner—Hassan Kizou
Assistant Examiner—Ahmed Elallam
(74) Attorney, Agent, or Firm—Cesari and McKenna, LLP

(57) ABSTRACT

The invention provides a router architecture that is scalable, that is, as more processing power is desired, more individual processors can be added. The data flow from each line can be distributed among all of the processors in the system. As desired services are added, increasing the amount of "touch" or processing performed on the packets in the system, more processors can be added to carry the increased load. The router architecture is also able to distribute the high interface rate of an uplink connection in the same manner. Packets are allocated to processors in a manner that allows the original order of data packets within the same flow to be maintained. The system uses a hash function to distribute the flows, making sure that packets within the same flow are sent to the same processor so that the original packet order in each flow is maintained. Different flows may be sent to different processors.

50 Claims, 5 Drawing Sheets

ROUTER ARCHITECTURE

U.S. PATENT DOCUMENTS

| | | |
|---|---|---|
| 4,456,957 A | 6/1984 | Schieltz |
| 4,464,658 A | 8/1984 | Thelen |
| 4,499,576 A | 2/1985 | Fraser |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,713,806 A | 12/1987 | Oberlander et al. |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,306 A | 1/1990 | Chao et al. |
| 4,903,261 A | 2/1990 | Baran et al. |
| 4,905,233 A | 2/1990 | Cain et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasiral et al. |
| 4,965,767 A | 10/1990 | Kinoshita et al. |
| 4,965,772 A | 10/1990 | Daniel et al. |
| 4,970,678 A | 11/1990 | Sladowski et al. |
| 4,979,118 A | 12/1990 | Kheradpir ............ 364/436 |
| 4,980,897 A | 12/1990 | Decker et al. |
| 4,991,169 A | 2/1991 | Davis et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,034,767 A | 7/1991 | Netz et al. |
| 5,034,919 A | 7/1991 | Sasai et al. |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,128,945 A | 7/1992 | Enns et al. |
| 5,136,580 A | 8/1992 | Videlock et al. |
| 5,166,930 A | 11/1992 | Braff et al. |
| 5,199,049 A | 3/1993 | Wilson |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,249,292 A | 9/1993 | Chiappa |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. ............ 730/85.13 |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,327,421 A | 7/1994 | Hiller et al. |
| 5,331,637 A | 7/1994 | Francis et al. |
| 5,345,445 A | 9/1994 | Hiller et al. |
| 5,345,446 A | 9/1994 | Hiller et al. |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,408,469 A | 4/1995 | Opher et al. |
| 5,414,704 A | 5/1995 | Spinney |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema |
| 5,442,457 A | 8/1995 | Najafi |
| 5,442,630 A | 8/1995 | Gagliardi et al. |
| 5,452,297 A | 9/1995 | Hiller et al. |
| 5,473,599 A | 12/1995 | Li et al. |
| 5,473,607 A | 12/1995 | Hausman et al. |
| 5,475,856 A | * 12/1995 | Kogge .................... 712/20 |
| 5,477,541 A | 12/1995 | White et al. |
| 5,485,455 A | 1/1996 | Dobbins et al. |
| 5,490,140 A | 2/1996 | Abensour et al. |
| 5,490,258 A | 2/1996 | Fenner |
| 5,491,687 A | 2/1996 | Christensen et al. |
| 5,491,804 A | 2/1996 | Heath et al. |
| 5,497,368 A | 3/1996 | Reijnierse et al. |
| 5,504,747 A | 4/1996 | Sweasey |
| 5,509,006 A | 4/1996 | Wilford et al. |
| 5,517,494 A | 5/1996 | Green |
| 5,519,704 A | 5/1996 | Farinacci et al. |
| 5,519,858 A | 5/1996 | Walton et al. ............ 395/600 |
| 5,526,489 A | 6/1996 | Nilakantan et al. |

| | | |
|---|---|---|
| 5,530,963 A | 6/1996 | Moore et al. |
| 5,535,195 A | 7/1996 | Lee |
| 5,539,734 A | 7/1996 | Burwell et al. |
| 5,541,911 A | 7/1996 | Nilakantan et al. |
| 5,546,370 A | 8/1996 | Ishikawa |
| 5,555,244 A | 9/1996 | Gupta et al. |
| 5,561,669 A | 10/1996 | Lenney et al. |
| 5,583,862 A | 12/1996 | Callon |
| 5,592,470 A | 1/1997 | Rudrapatna et al. |
| 5,598,581 A | 1/1997 | Daines et al. |
| 5,600,798 A | 2/1997 | Cherukuri et al. |
| 5,602,770 A | 2/1997 | Ohira |
| 5,604,868 A | 2/1997 | Komine et al. |
| 5,608,726 A | 3/1997 | Virgile |
| 5,617,417 A | 4/1997 | Sathe et al. |
| 5,617,421 A | 4/1997 | Chin et al. |
| 5,630,125 A | 5/1997 | Zellweger |
| 5,631,908 A | 5/1997 | Saxe |
| 5,632,021 A | 5/1997 | Jennings et al. |
| 5,633,858 A | 5/1997 | Chang et al. |
| 5,634,010 A | 5/1997 | Ciscon et al. |
| 5,638,359 A | 6/1997 | Peltola et al. |
| 5,644,718 A | 7/1997 | Belove et al. |
| 5,659,684 A | 8/1997 | Giovannoni et al. |
| 5,666,353 A | 9/1997 | Klausmeier et al. |
| 5,673,265 A | 9/1997 | Gupta et al. |
| 5,678,006 A | 10/1997 | Valizadeh et al. |
| 5,680,116 A | 10/1997 | Hashimoto et al. |
| 5,684,797 A | 11/1997 | Aznar et al. ............... 370/390 |
| 5,687,324 A | 11/1997 | Green et al. |
| 5,689,506 A | 11/1997 | Chiussi et al. ............. 370/388 |
| 5,694,390 A | 12/1997 | Yamato et al. |
| 5,708,659 A | 1/1998 | Rostoker et al. |
| 5,724,351 A | 3/1998 | Chao et al. |
| 5,740,097 A | 4/1998 | Satoh |
| 5,748,186 A | 5/1998 | Raman ....................... 345/302 |
| 5,748,617 A | 5/1998 | McLain, Jr. |
| 5,754,547 A | 5/1998 | Nakazawa |
| 5,757,795 A | 5/1998 | Schnell |
| 5,802,054 A * | 9/1998 | Bellenger ................... 370/401 |
| 5,835,710 A | 11/1998 | Nagami et al. |
| 5,841,874 A | 11/1998 | Kempke et al. |
| 5,852,607 A | 12/1998 | Chin |
| 5,854,903 A | 12/1998 | Morrison et al. |
| 5,856,981 A | 1/1999 | Voelker |
| 5,892,924 A | 4/1999 | Lyon et al. ............ 395/200.75 |
| 5,898,686 A | 4/1999 | Virgile |
| 5,903,559 A | 5/1999 | Acharya et al. |
| 5,905,723 A * | 5/1999 | Varghese et al. ............ 370/351 |
| 5,905,725 A | 5/1999 | Sindhu et al. |
| 5,905,873 A * | 5/1999 | Hartmann et al. .......... 709/249 |
| 5,909,440 A | 6/1999 | Ferguson et al. |
| 5,914,953 A | 6/1999 | Krause et al. |
| 5,923,654 A * | 7/1999 | Schnell ........................ 370/390 |
| 5,970,232 A * | 10/1999 | Passint et al. .............. 709/238 |
| 6,006,264 A | 12/1999 | Colby et al. |
| 6,011,780 A | 1/2000 | Vaman et al. |
| 6,018,524 A * | 1/2000 | Turner et al. ................ 370/392 |
| 6,044,080 A * | 3/2000 | Antonov ...................... 370/401 |
| 6,058,422 A * | 5/2000 | Ayanoglu et al. ........... 709/226 |
| 6,084,877 A | 7/2000 | Egbert et al. |
| 6,111,877 A | 8/2000 | Wilford et al. |
| 6,160,811 A * | 12/2000 | Partridge et al. ............ 370/401 |
| 6,173,384 B1 * | 1/2001 | Weaver ....................... 711/216 |
| 6,175,874 B1 * | 1/2001 | Imai et al. ................... 709/238 |
| 6,292,483 B1 | 9/2001 | Kerstein |

OTHER PUBLICATIONS

Becker, D., "3c589.c: A 3c589 EtherLink3 ethernet driver for linux," becker @CESDIS.gsfc.nasa.gov, May 3, 1994, pp. 1–13.

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–Contiguous Wildcarding," Abstract, Bellcore.

Zhang, et al., "Rate–Controlled Static–Priority Queueing," INFOCOM 1993, pp. 227–236.

* cited by examiner

ROUTER ARCHITECTURE

SAMPLE FLOW DIAGRAM FOR A DATA PACKET

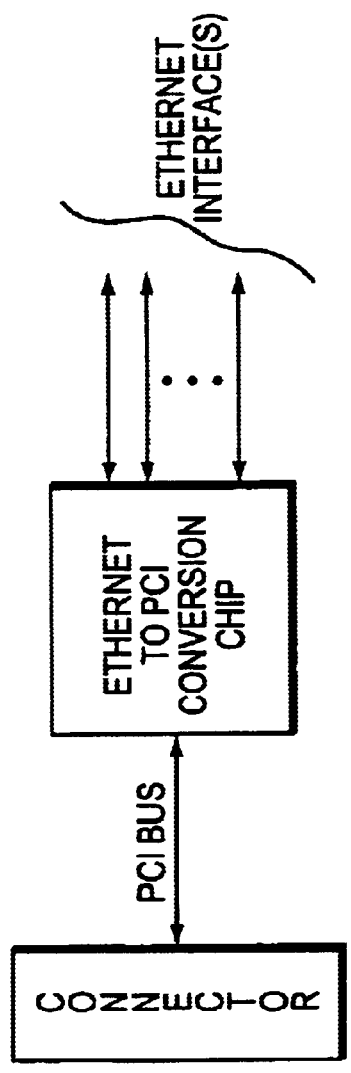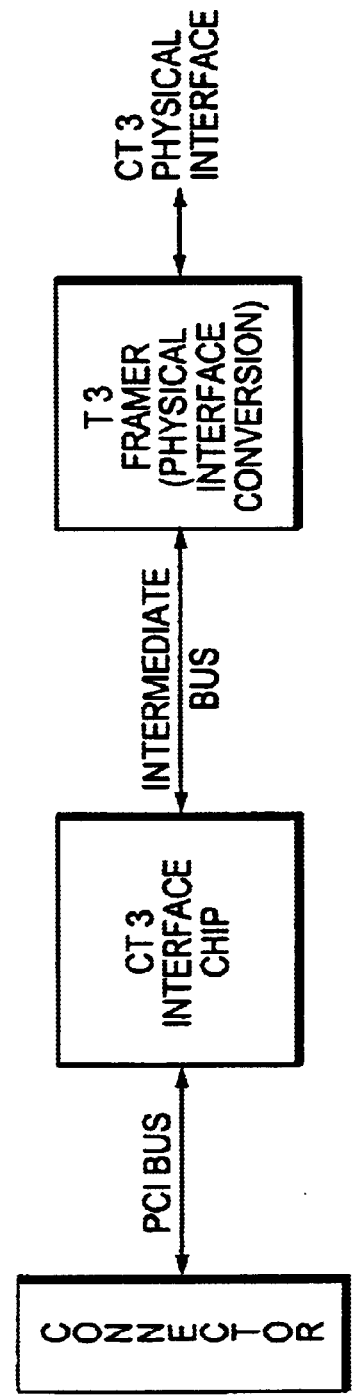

DATA COMPILER

ROUTE/SERVICE PROCESSOR SCALABILITY VIA FLOW-BASED DISTRIBUTION OF TRAFFIC

CROSS-REFERENCE TO RELATED APPLICATION

The subject matter of the subject application is related to that in copending U.S. Patent Application Ser. No. 09/621,415 filed Jul. 21, 2000, entitled "Load Sharing Across Flows."

BACKGROUND OF THE INVENTION

1. Field of the Invention

The present invention relates to architecture for a router. More particularly, the present invention relates to architecture for a router with scalable processing power.

2. The Prior Art

Computers generate and utilize large amounts of data. Different components in a computer network, for example, several different computers each with an internet connection or "uplink", need to be linked together to allow for the transfer of data among the different components in the network. Routers perform this function. Routers take data input from one component in a network and ensure that it is properly transferred to another component in the network.

Different components in a computer network may also generate data in different forms and at different speeds. A router system in conjunction with other network interface components can properly bundle different types of information, transmit the information among different components in a computer network, and ensure that each component of the computer network is allowed to give and receive data at a rate proper for that particular component. Examples of network interface components include Ethernet transceivers and CT3 HDLC channel link data managers (as embodied in the PMC-Sierra CT3 interface chip).

Data bytes are generally bundled into "packets", a discrete grouping of information bytes that will be transferred together along the router system. Packets containing related information in a logical order are grouped into "flows". A flow consists of a unidirectional stream of packets to be transmitted between a particular source and a particular destination. Packets within the same flow will have the same source/destination address, the same source/destination port, and the same protocol. It is required to maintain the packet ordering within a flow.

Speed and accuracy are two important features of routers. If the data transfer rate, or throughput rate, is not rapid enough, the end user of the required data must wait for it to arrive, wasting valuable processing time. Also, input and output queues waiting to transfer data may overflow if information is being added more rapidly than it is being removed. Accuracy in transfer is also important to ensure that data arrives at its proper destination in the proper order.

Routers can also provide services as they perform the data transfer or switching. Some of these services involve gathering information about the data being transferred or performing some other processing function upon the data as it is being transferred from one component in the computer network to another. Some of the more recent service developments involve "touching", or performing some processing function, on the data in most or every packet as it is transferred. Such "high touch" services can require the router system to have a great deal of processing power. New services are being developed all the time, and thus the amount of processing that performing services requires is unbounded.

Current routing systems generally operate on a "one processor per line card" model. A line card is a group of components in a computer network such as a group of modems or an internet connection which sends and receives data. In a "one processor per line card" model, all of the processing for a single line, or a group of related lines, is done by a dedicated processor. This model works acceptably well if the line's rate of data input, or input interface rate, is low enough so that the processor does not become a bottleneck in the system. With low enough interface rates, one processor can handle multiple lines.

However, the line's interface rate may increase as higher-speed computers or internet connections are added. Furthermore, additional router services may become desirable. Eventually, the dedicated processor may no longer be able to keep up with the processing requirements of the line and the throughput rate will slow down. If the throughput rate becomes unacceptably slow, the only solution is generally to replace the dedicated processor with a more powerful machine. This is an expensive solution. In certain cases, for example a high-speed internet line or "uplink", a processor may not even be available that can keep up with the interface rate of the high-speed line. Current internet uplink rates such as Gigabit Ethernet (1 gigabit per second) are already becoming difficult to handle with a single dedicated processor.

Accordingly, it would be desirable to provide a router architecture that would be easily scalable to accommodate future router service growth as well as expandable uplink connections, and which would allow processors to be added as more processing power became necessary, without requiring the entire system's future hardware needs to be purchased initially. It would also be advantageous to maintain packet ordering within each flow while still flexibly routing among different processors as necessary.

SUMMARY OF THE INVENTION

The invention provides a system and a method for a router architecture that is scalable, that is, as more processing power is desired, more individual processors can be added. The data flow from each line can be distributed among all of the processors in the system. As desired services are added, increasing the amount of "touch" or processing performed on the packets in the system, more processors can be added to carry the increased load. The router architecture is also able to distribute the high interface rate of an uplink connection in the same manner.

In a preferred embodiment, packets are allocated to processors in a manner that allows the original order of data packets within the same flow to be maintained. The system uses a hash function to distribute the flows, making sure that packets within the same flow are sent to the same processor so that the original packet order in each flow is maintained. Different flows may be sent to different processors.

BRIEF DESCRIPTION OF THE DRAWINGS

FIG. 3a shows an example port adapter design for an Ethernet interface.

FIG. 3b shows an example port adapter design for a channelized T3 line (CT3) interface.

DETAILED DESCRIPTION OF A PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

The present invention provides a router architecture capable of implementing a wide variety of services while balancing the router system load among a number of processors. The router architecture of the present invention is also capable of distributing the load from a single uplink among the multiple processors. The ability to distribute the router system load among all of the processors in the system makes the system throughput scalable; the throughput rate increases with each additional processor. Because there is no cooperation problem among the processors and each is acting independently and preferably on separate flows, the system throughput is expected to scale approximately linearly with the number of processors.

The use of multiple processors which are redundant also provides added reliability. If one processor fails, the processing tasks can be allocated among the remaining processors.

Figure 1:
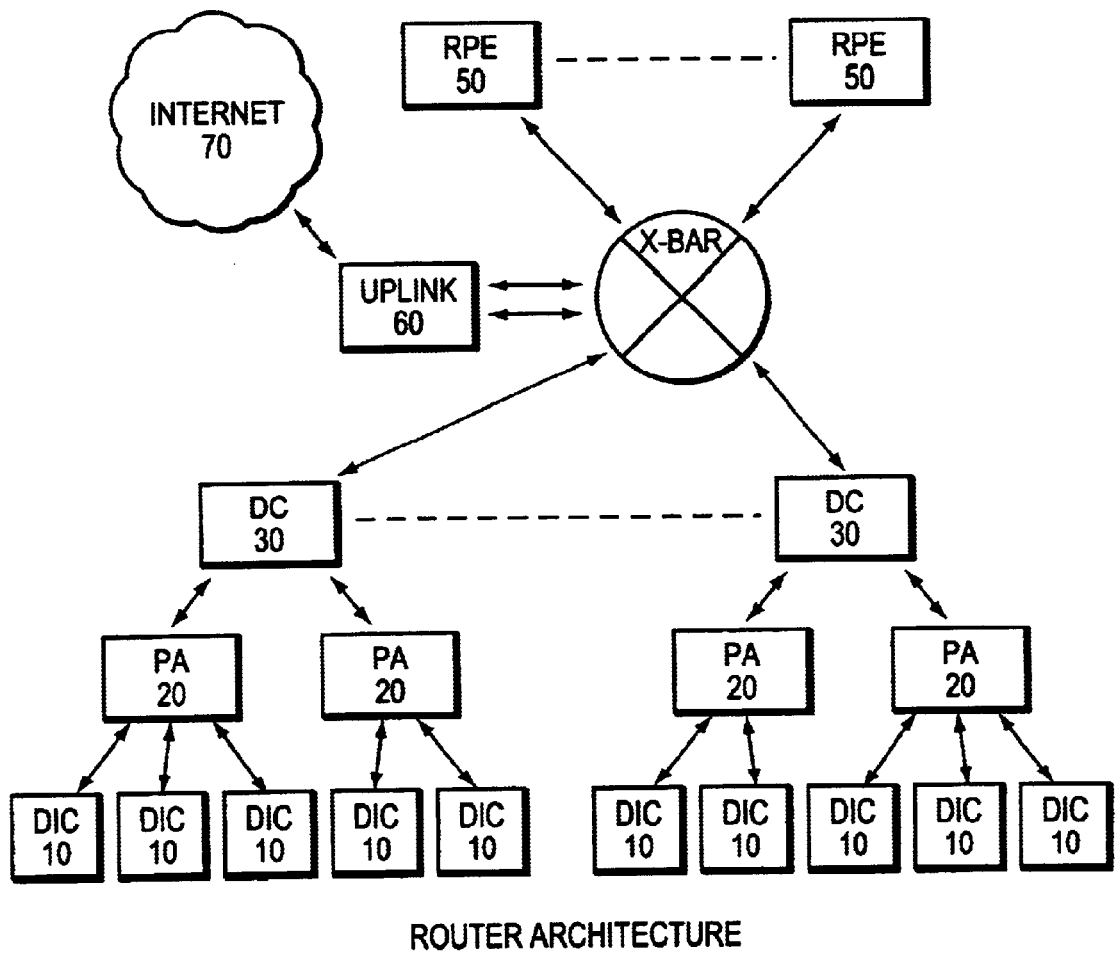
FIG. 1 shows a logical block diagram of the router architecture of the present invention.

FIG. 1 shows a logical block diagram of the components in the router system. FIG. 1 is intended to show the interconnections and resulting scalability of the router system architecture, and is not meant to be an accurate representation of the number of the various components in the router system in any particular embodiment. Individual data interface components 10 are connected to a set of Port Adapters ("PA" s) 20, which are in turn connected to a set of Data Compilers (DCs) 30. The DCs 30, an Uplink 60, and a set of Route Processing Engines (RPEs) 50 are all interconnected through an Xbar 40. The Uplink 60 is connected to an external network such as the internet 70. Data transfer originates at either the individual data interface components 10 or the internet 70 and travels through the router system to the Xbar 40, where it is sent on to be processed by a selected one of the RPEs 50. Once processing is complete, the data is transferred back through the Xbar 40 to its final destination, either the internet 70 or an individual data interface component 10.

Figure 2:
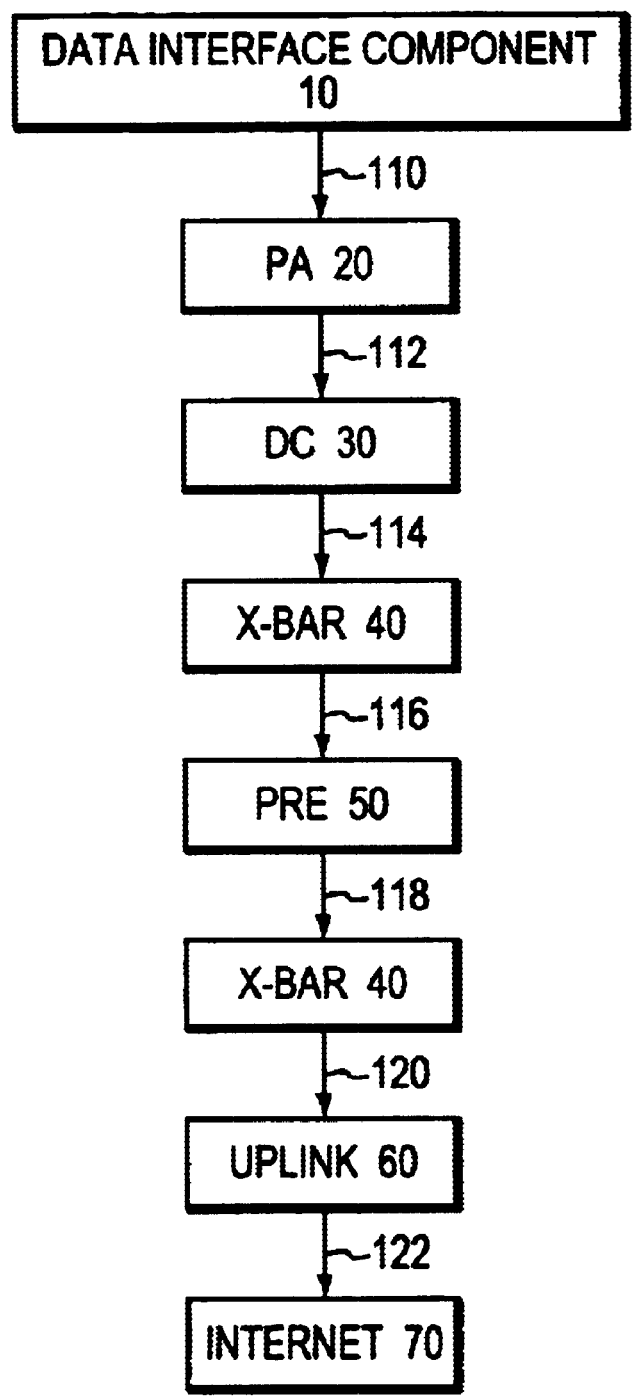
FIG. 2 shows a sample flow diagram for a data packet.

Data flow through the system is more easily followed through a sample flow diagram for a data packet as shown in FIG. 2. FIG. 2 shows only one example of a data packet flow path; numerous other paths are possible using a router system of the present invention. FIG. 2 shows an individual computer generating the original data. This data may be sent out via modem to be routed to another part of the router system. Methods of transferring data via modem are well known in the art of computer networking systems. The example in FIG. 2 of an individual computer and a modem is purely illustrative of an individual data interface component 10 in a router system as shown in FIG. 1. Other types of data interface components could serve the same function; for example, a T1 connection (1.5 Mbps) could also function to provide data to a PA 20.

In step 110, the data is first sent to the PA 20. A single PA 20 is capable of handling the throughput from multiple modems or other individual data interface components 10 since such components send data at a relatively slow and intermittent rate. The PA 20 bundles this data it has received from multiple modems or other interface lines into packets. Each packet is represented as a series of descriptors in a format compatible with the PA 20. Network interface components, such as many Ethernet transceivers and HDLC channel managers, use a descriptor approach to transfer packet data to a local memory, possibly with the help of a local microprocessor. Each descriptor effectively indicates a memory block (called a particle) and a size, as well as control information such as whether this is the first or last descriptor in a packet. These packets are the main units of data sent across computer network systems. The creation and use of data packets are well known in the art of computer networking systems.

Various types of PAs are available to convert between different user interfaces and a generic PCI bus. The PCI (Peripheral Component Interconnect) bus is known in both the computer and networking industries. FIG. 3a shows a representative PA design for an Ethernet interface. FIG. 3b shows a representative PA design for a channelized T3 line (CT3) interface. Other user interfaces such as OC-3 (a fiber-optic standard) may also be converted using a PA.

Figure 4:
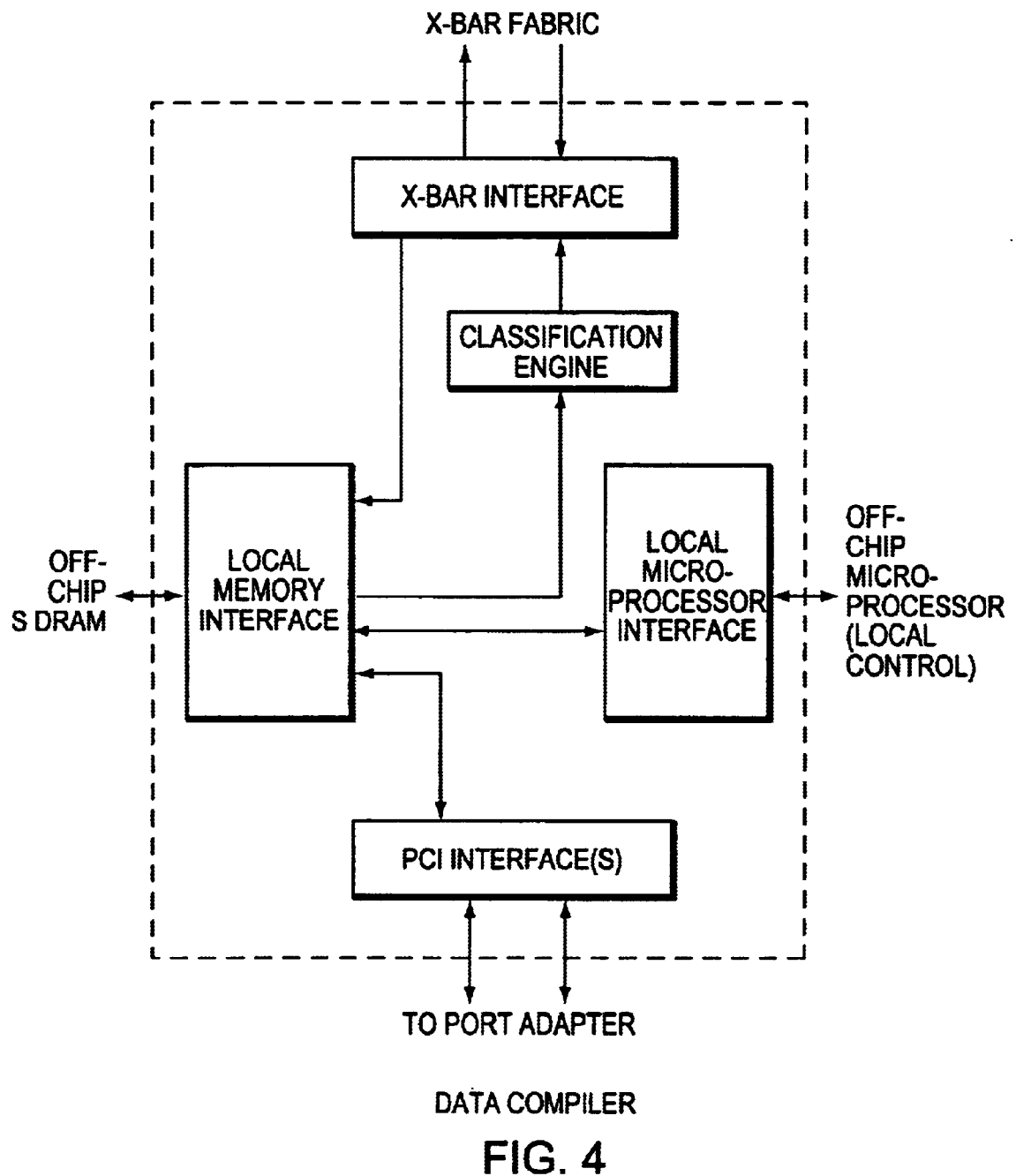
FIG. 4 shows an example Data Compiler.

In step 112, the data packets from the PA 20 are sent to a DC 30. A DC provides an interface between the internal fabric in the router and a generic PCI bus which can connect to a PA. FIG. 4 shows a representative Data Compiler. The DC 30 further prepares the packets for transfer along the routing system by putting them into packet digest form, and then forwards the packets along to the Xbar 40. A packet digest contains both a header and a payload. The DC 30 will further "packetize" the incoming packets by converting them from the particles to a consecutive block of memory, forming the "payload" for a packet digest. The DC 30 will also add a packet digest header.

The packet digest header contains information about the packet to aid in the prompt forwarding and processing of the packet, such as—the Xbar 40 source port number, the size of the packet digest header and payload, the destination RPE 50, the packet priority, the protocol type, and the class of service required.

Figure 5:
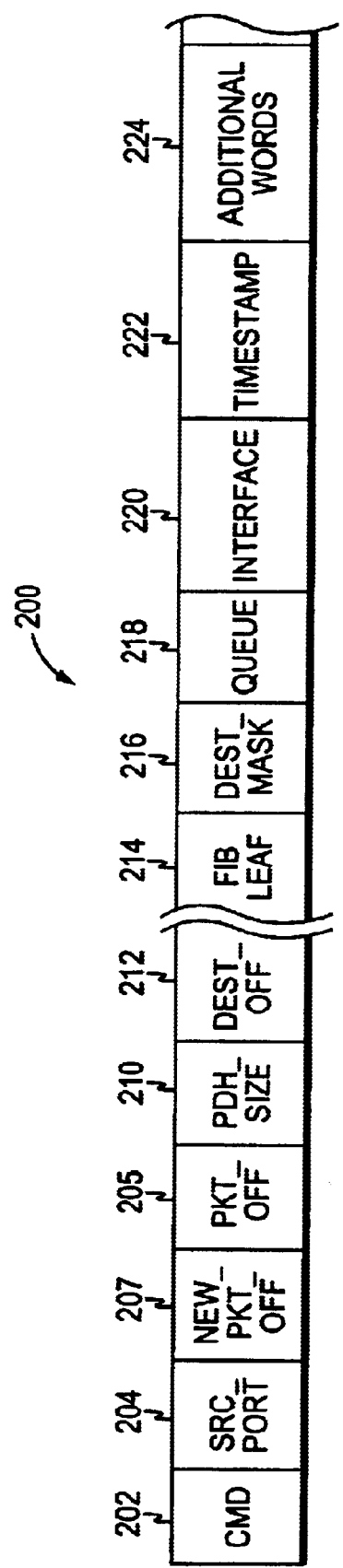
FIG. 5 shows an example packet digest format.

FIG. 5 shows an example packet digest format 200. In a preferred embodiment, the packet digest includes the following fields:

a CMD field 202 to control features of the packet digest (such as the TIMESTAMP field, as described below), and to indicate a type of packet digest (where there is more than one type, such as in alternative embodiments);

a SRC_PORT field 204 to indicate a source ID of the transmitting entity;

a PKT_OFF 205 field and a NEW_PKT_OFF field 207 to indicate an number of bytes of padding between the packet digest header and the packet digest payload (where the PKT_OFF indicates a total size of the packet digest header plus any padding, while the NEW_PKT_OFF field indicates a new value for PKT_OFF);

a PDH_SIZE field 210 to indicate the size of the packet digest header;

a DEST_OFF field 212 to indicate an offset of the destination IP address in the packet digest header;

a "FIB Leaf" field 214 to indicate a pointer to the leaf in a FIB lookup m-trie for the destination IP address;

a DEST_MASK field 216 to indicate which Xbar ports are intended as destinations for the packet (where a selected bit <39> of the DEST_MASK field preferably indicates a multicast packet);

a QUEUE field 218 to indicate to which hardware output queue at the particular output interface to direct the packet;

an INTERFACE field 220 to indicate to which hardware output interface to direct the packet;

a TIMESTAMP field 222 to indicate a timestamp or other data to be written by the in-bound Xbar interface (where a selected bit CMD <0> indicates that the TIMESTAMP field should be written to); and a set 224 of additional words reserved for software classification data.

In order to determine the destination RPE 50, the DC 30 includes a classification engine coupled to the crossbar interface to determine which RPE 50 will receive each packet. Packets are not distributed randomly among RPEs, so as to maintain the original ordering of packets within the same flow. The classification engine distributes packets so that packets within the same flow will be sent to the same RPE, but packets in different flows may be sent to different RPEs and possibly reordered as determined by RPE resources.

The classification engine analyzes the router system traffic and distributes flows to multiple processors. The distribution is partly table-driven, and is thus flexible and easily changeable, even dynamically. In a preferred embodiment, the classification uses a hash function of packet flow information to select a specific RPE 50 to handle processing for that packet flow. The hash function distributes packets evenly among the processors in response to flow information such as the source/destination address, the source/destination port, and the protocol. The hash function can operate using any information that will allow for flow preservation.

In a preferred embodiment, the hash function performs an XOR (exclusive OR) logical function of several bytes of fields from the IP header of the packet, including the following fields:

a source IP address (four bytes);

a destination IP address (four bytes); and a protocol type value (one byte).

The XOR logical function is performed for all nine bytes, providing a single byte output value, which can be used to index into a 256-entry table for selecting the RPE 50.

Once the DC 30 has determined the packet's destination RPE 50 and the packet header and payload are ready to be sent out, the packet (now in packet digest form) is placed in an input queue to be stored until it is sent to the selected RPE 50. Note that the amount of processing performed by the DC 30 on each packet is bounded; the DC 30 only does a fixed amount of work per packet. There is no cost in terms of DC 30 processing for adding additional services, as all such additional processing will be performed by the RPEs 50. Thus, the DC 30 is prevented from becoming a system bottleneck as more services are added. In the router system of the present invention, DC 30 input queues should only overflow if there are not enough RPEs 50 to support the requested level of services at the incoming data rates; if input queues overflow, it is always possible to add more RPEs 50.

In step 114, packets are sent from the DC 30 to the Xbar 40. The Xbar 40 provides the interconnection between the data origination component ports, the router system processor ports, and the data destination component ports. In one data transfer, the data packet will cross through the Xbar 40 twice (step 114 and step 118 in FIG. 2). The Xbar 40 receives an incoming packet and transfers it to the selected RPE, and then the Xbar 40 transfers the packet back to its destination port. The Xbar 40 must provide enough bandwidth to handle the data interface rates of both the DCs 30 and the Uplink 60. Xbar interconnections are known in the art of computer and router systems.

The Xbar 40 includes a number of ports; each port is a pair of unidirectional links. The Xbar 40 implements a simple arbitration scheme between sending and receiving components, ignoring whether the destination port has the resources to handle the packet or not. Packets can be dropped at any point if there are not sufficient resources to handle them. Software must ensure that there are sufficient resources available at a destination port, for example, memory space at the output to queue the packet, before sending a packet over the Xbar 40. Output queuing protocols determine what occurs when an output queue overflows; output queue management is performed at the DC 30.

The Xbar 40 includes an arbiter—ports forward their requests to the arbiter, and grants are sent back. The Xbar 40 arbiter uses a windowing scheme in which each port can make requests for multiple destinations at the same time; the arbiter attempts to find the best fit between requesting ports and destinations. The Xbar 40 can also support multicast—a port can request that a packet be sent to multiple destinations. In the preferred embodiment, the Xbar 40 waits for all ports to be free, and then sends the multicast request all at once. Numerous other Xbar multicast schemes are well known in the art.

The Xbar 40 in the preferred embodiment discussed herein is packet-based, but the Xbar 40 could be designed to be cell-based and still fall within the inventive concepts disclosed herein. It is also possible to provide multiple Xbars or a bus that performs the same function as the Xbar. The methods discussed herein for the implementation of such an Xbar device are by no means limiting. Alternate methods for the implementation of such an Xbar device will readily suggest themselves to those of ordinary skill in the art.

In step 116, the Xbar 40 transfers the packet to the destination RPE 50. There are multiple RPEs 50 connected to the Xbar 40 that provide both switching and services, including the high-touch type of services that may require a great deal of processing power. Such services may also be added later to the system as more services are developed and become available. Additional RPEs 50 can be added to the router system to provide additional processing power; this provides the scalability feature of the present invention.

An RPE 50 receives a packet digest with a packet digest header containing classification information provided by the DC 30. Based on the classification information, the packet is put into one of a small number of input queues on the RPE 50. The intent of the RPE 50 queuing is to provide the capability for handling both high- and low-priority packets. Packets are processed from among the RPE's input queues by the RPE 50 processor in whatever order it sees fit.

The RPE 50 processor will perform various tasks on the packet, including switching, tag application/update, access list processing (filtering), and all other router service functions. Some of these operations result in the RPE 50 modifying the packet digest, others only update RPE-internal data structures. When the RPE 50 processor is done with a packet, the RPE 50 will know the packet's final destination. The example destination in FIG. 2 is the internet 70 via the Uplink connection 60. However, it would be evident to one of ordinary skill in the art that the packet's destination could also be an individual data interface component 10 via a DC 30 and a PA 20.

In step 118, the packet is put back on the Xbar 40 from the RPE 50. In step 120, the Xbar 40 transmits the packet to the Uplink 60. The Uplink 60 is a high-bandwidth PA with its own DC. Like a DC, the Uplink 60 is connected to the Xbar 40 via an Xbar link. However, in order to meet its bandwidth requirements, an Uplink 60 may require multiple Xbar ports. The Xbar 40 can support multiple Uplink 60 connections.

In step 122, the Uplink 60 transfers the data to the internet 70, completing the data transfer from the individual data interface component 10 to the internet 70.

The Uplink(s) 60 can also send data to the Xbar 40 for transmission to an RPE 50 and eventual transfer to an individual data interface component 10. The Uplink(s) 60's traffic from the internet 70 is also distributed via the Xbar 40 to the various RPEs 50 using a hash function. In this way, the router system can support a plurality of Uplink(s), each of arbitrary speed.

Various alternate embodiments of the present invention have also been conceived, and would be clear to those skilled in the art after reviewing this application. For example, in alternative embodiments, the DC and a specific PA type can be integrated together to produce a more cost-effective, though less easily adaptable, interface.

Other alternative embodiments include performing some services of a bounded nature on the DCs, as is currently done with output queuing. For example, the DCs could accumulate statistics and do flow-based accounting on each packet. In this way, the DCs could handle some portion of the known processing load leaving unbounded and future services to the RPEs.

Yet other alternative embodiments include adding specialized processing engines connected to the Xbar. Packets can be sent through these specialized engines either before or after or instead of an RPE to perform services such as compression/decompression, encryption, or routing. The classification engine on a DC could determine the type of service required by a packet and route it appropriately.

While embodiments and applications of this invention have been shown and described, it would be apparent to those skilled in the art that many more modifications than those mentioned above are possible without departing from the inventive concepts herein. The invention, therefore, is not to be restricted except in the spirit of the appended claims.

What is claimed is:

1. A routing system for distributing packets in a network, wherein the packets originate at a source and are returned to a destination, both source and destination external with respect to the routing system, comprising:
    a plurality of network interfaces that transfer packets to a destination and from a source;
    a plurality of route processing engines;
    a hash mechanism that performs a hashing function on at least a portion of net-work layer information packet, in the packets transferred to the routing system, to determine a distribution of the packets to the route processing engines for processing by the engines;
    a processing mechanism that determines packets belonging to a same flow and their original order from the network layer information of the packets, the network layer information including at least the same source/destination and protocol; and
    a data transferer that sends each ordered packet flow to a single route processing engine, thereby preserving the original ordered packet flows.

2. A router, comprising:
    a plurality of processing engines for processing packets;
    an interface for receiving a received packet from a network;
    a data compiler to perform a hash function on said received packet to generate a hash result, and to select a selected processing engine from said plurality of processing engines in response to said hash result; and,
    a switch to distribute said packet to said selected processing engine; and
    said data compiler determines an IP source address having source bytes and an IP destination address having destination bytes and a protocol byte, and performs said hash function by performing an exclusive OR (XOR) to said source byter and said destination byter and protocol byter to generate said hash result as at least one output byte, said at least one output byte to designate a flow to which said received packet belongs, and routing all packets having the same flow to a selected processing engine.

3. A router, comprising:
    a plurality of processing engines located within said router for processing packets;
    an interface for receiving a received packet from a network;
    a data compiler to perform a hash function on a destination address of said received packet to generate a hash result, and to select a selected processing engine from said plurality of processing engines located within said router in response to said hash result;
    a switch to distribute said packet to said selected processing engine; and
    each processing engine of said plurality of processing engines having a plurality of queues, said packed has classification information in a header, and said processing engine selects a queue of said plurality of queues in response to said classification information.

4. A router, comprising:
    a plurality of processing engines for processing packets;
    an interface for receiving a received packet from a network;
    a data compiler to perform a hash function on said received packet to generate a hash result, and to select a selected processing engine from said plurality of processing engines in response to said hash result;
    a switch to distribute said packet to said selected processing engine;
    said data compiler detecting that a particular packet requires specialized processing; and
    said switch distributing said particular packet to specialized processing engine to perform said specialized processing.

5. A method of processing packet in a router, comprising:
    receiving a packet from a network;
    performing a hash function calculation on said packet to produce a hash result;
    switching, in response to said hash result, said packet to a processing engine of a plurality of processing engines in said router, for further processing of said packet; and
    performing an exclusive OR (XOR) in response to a source address and a destination address and a protocol byte to generate said hash result as a least one output byte, said at least one output byte to designate a flow to which said received packet belongs, and routing all packets having the same flow to a selected processing engine.

6. A method of processing packet in a router, comprising:

receiving a packet from a network;

performing a hash function calculation on a destination address of said packet to produce a hash result;

switching, in response to said hash result, said packet to a processing engine of a plurality of processing engines in said router, for further processing of said packet; and allocating said packets to remaining processing engines in the event that a processing engine fails.

7. A method of processing packet in a router, comprising:

receiving a packet from a network;

performing a hash function calculation on said packet to produce a hash result;

switching, in response to said hash result, said packet to a processing engine of a plurality of processing engines in said router, for further processing of said packet;

detecting that a particular packet requires specialized processing; and distributing said particular packet to a specialized processing engine to perform said specialized processing.

8. A router, comprising:

a plurality of processing engines located within said router for processing packets;

an interface for receiving a packet from a network, said packet referred to as a received packet;

a hashing function to perform a hash calculation on a destination address of said packet, said hash calculation producing a hash result;

a data compiler to determine a type of service required by said received packet; and;

a switch, responsive to said type of service and responsive to said hash result, to distribute said packet to a selected processing engine of said plurality of processing engines located within said router, said selected processing engine providing said type of service.

9. The router as in claim 2, or claim 3, further comprising:

said data compiler selection of said processing engine is partly table driven.

10. The router as in claim 2, or claim 3, further comprising:

said data compiler distributes the packets among said plurality of processing engines.

11. The router as in claim 2, or claim 3, or claim 4, further comprising:

said hash function uses a destination address information.

12. The router as in claim 2, or claim 3, or claim 4, further comprising:

said hash function uses a protocol information.

13. The router as in claim 2, or claim 3, or claim 4, further comprising:

said hash function uses a source port information.

14. The router as in claim 2, or claim 3, further comprising:

said data compiler puts packets received from said network into packet digest from before transferring them to said switch.

15. The router as in claim 2, or claim 3, further comprising:

said switch receiving said packet after said processing engine finishes processing said packet, and then said switch routing said packet to an interface to transmit said packet out to said network.

16. The router as in claim 2, or claim 3, further comprising:

said processing engine performs routing of said packet.

17. The router as in claim 2, or claim 3, further comprising:

said processing engine performs filtering on said packet.

18. The router as in claim 2, or claim 3, further comprising:

said data compiler allocating said processing of packets to remaining processing engines in the event that a processor fails.

19. The router as in claim 2, or claim 3, further comprising:

said processing engine performs encryption on said packet.

20. The router as in claim 2, or claim 3, further comprising:

said processing engine performs decryption on said packet.

21. The router as in claim 2, or claim 3, or claim 4, further comprising:

said switch is a crossbar switch.

22. The router as in claim 3, further comprising:

said classification information indicates a priority of said packet.

23. The router as in claim 4, further comprising:

said specialized processing is compression.

24. The router as in claim 4, further comprising:

said specialized processing is decompression.

25. The router as in claim 4, further comprising:

said specialized processing is routing.

26. The router as in claim 4, further comprising:

said specialized processing is routing.

27. The method as in claim 5, or claim 6, further comprising:

selecting a processing engine by using said hash result and a table.

28. The method as in claim 5, or claim 6, further comprising:

distributing the packet among said plurality of processing engines.

29. The method as in claim 5, or claim 6, or claim 7, or claim 8, further comprising:

using a source address information in said hash function calculation.

30. The method as in claim 5, or claim 6, or claim 7, or claim 8, further comprising:

using a destination address information in said hash function calculation.

31. The method as in claim 5, or claim 6, or claim 7, or claim 8, further comprising:

using a protocol information in said hash function calculation.

32. The method as in claim 5, or claim 6, or claim 7, or claim 8, further comprising:

using a source port information in said hash function calculation.

33. The method as in claim 7, further comprising:

processing decompression as said specialized processing.

34. The method as in claim 7, further comprising:

processing decompression as said specialized processing.

35. The method as in claim 7, further comprising:
processing encryption as said specialized processing.
36. The method as in claim 7, further comprising:
processing routing as said specialized processing.
37. The router as in claim 8, further comprising:
said type of service is comprising.
38. The router as in claim 8, further comprising:
said type of service is decompression.
39. The router as in claim 8, further comprising:
said type of service is encryption.
40. The router as in claim 8, further comprising:
said type of service is routing.
41. A router for distributing packets in a network, the packets originate at a source and are routed to a destination, comprising:
a plurality of route processing engines located within said router;
a mechanism that performs a hashing function on at least a portion of network layer information in said packets, said information indicating said destination, said hashing function producing an indica of a flow;
a classification engine to switch packets with a same indica of a flow to a single route processing engine of said plurality of route processing engines; and
said packets are a plurality of packets, individual packets of said plurality of packets arrive in substantially random order to produce different values of said information in random order, and said classification engine carries out a hashing function to produce said indica of flow, and different values of said indica of flow are in substantially random order in response to said plurality of packets arriving in random order, and a particular flow always produces a same indica of flow, and said particular flow is assigned to a particular route processing engine in the order that a first packet of said particular flow first arrives at said router.
42. The router of claim 41, further comprising:
said random order of arrival of said first packet of said particular flow leads to a distribution of packets being assigned to said route processing engine.
43. The route of claim 41, further comprising:
said information indicating said destination includes a destination address of said destination.
44. A method of operating a router, comprising:
receiving a packet by said router, said packet addressed to a destination, said router having a plurality of route processing engines;
hashing a portion of a network layer information of said packet, said information indicating said destination, to determine an indication of a flow;
selecting, in response to said indication of a flow, one processing engine of said plurality of processing engines to process the flow indicated;
said receiving step receives a plurality of packets, individual packets of said plurality of packets arrive in substantially random order to produce different values of said information in random order;
said hashing step produces different values of said indication of a flow in substantially random order in response to said plurality of packets arriving in random order;
producing by a particular flow a same indica of flow; and
assigning said particular flow to a particular route processing engine in the order that a first packet of said particular flow first arrives at said router.

45. The method of claim 44, further comprising:
assigning, in response to said random order of arrival of said first packet of said particular flow, a distribution of packets to said route processing engines.
46. The method of claim 44, further comprising:
including in said information a destination address of said destination.
47. A router, comprising:
a port adapter to receive a packet by said router, said packet addressed to a destination, said router having a plurality of route processing engines;
means for hashing a portion of a network layer information of said packet, said information indicating said destination, to determine an indication of a flow;
means for selecting, in response to said indication of a flow, one processing engine of said plurality of processing engines to process the flow indicated;
means for receiving a plurality of packets, individual packets of said plurality of packets arrive in substantially random order to produce different values of said information in random order;
means for producing different values of said indication of a flow in substantially random order in response to said plurality of packets arriving in random order;
means for producing by a particular flow a same indica of flow; and
means for assigning said particular flow to a particular route processing engine in the order that a first packet of said particular flow first arrives at said router.
48. The router of claim 47, further comprising:
means for assigning, in response to said random order of arrival of said first packet of said particular flow, a distribution of packets to said route processing engines.
49. The router of claim 47, further comprising:
said information includes a destination address of said destination.
50. A computer readable media, comprising:
said computer readable media having instructions written thereon for execution on a processor for the practice of the method of,
receiving a packet by said router, said packet addressed to a destination, said router having a plurality of route processing engines;
hashing a portion of a network layer information of said packet, said information indicating said destination, to determine an indication of a flow;
selecting, in response to said indication of a flow, one processing engine of said plurality of processing engine to process the flow indicated;
said receiving step receives a plurality of packets, individual packets of said plurality of packets arrive in substantially random order to produce different values of said information in random order;
said hashing step produces different values of said indication of a flow in substantially random order in response to said plurality of packets arriving in random order;
producing by a particular flow a same indica of flow; and
assigning said particular flow to a particular route processing engine in the order that a first packet of said particular flow first arrives at said router.

* * * * *